US012639196B2

(12) United States Patent
Gonzales et al.

(10) Patent No.: US 12,639,196 B2
(45) Date of Patent: May 26, 2026

(54) AUTOMATIC MOCK ENABLEMENT IN A MULTI-MODULE SOFTWARE SYSTEM

(71) Applicant: Lendingclub Bank, National Association, Lehi, UT (US)

(72) Inventors: Eddie Gonzales, Richmond, CA (US); Somesh Benchalli, Sunnyvale, CA (US); Phani Pradeep Benarji Kommana, Pleasanton, CA (US); Ali Nazari, Brisbane, CA (US)

(73) Assignee: Lendingclub Bank, National Association, San Francisco, CA (US)

( * ) Notice: Subject to any disclaimer, the term of this patent is extended or adjusted under 35 U.S.C. 154(b) by 0 days.

(21) Appl. No.: 16/022,437

(22) Filed: Jun. 28, 2018

(65) Prior Publication Data

US 2020/0004664 A1 Jan. 2, 2020

(51) Int. Cl.
*G06F 11/3668* (2025.01)

(52) U.S. Cl.
CPC ...... *G06F 11/3684* (2013.01); *G06F 11/3688* (2013.01)

(58) Field of Classification Search
CPC ............. G06F 11/3684; G06F 11/3688; G06F 11/3664; G06F 11/3692; G06F 11/3696
See application file for complete search history.

(56) References Cited

U.S. PATENT DOCUMENTS

| | | | | |
|---|---|---|---|---|
| 4,499,555 A * | 2/1985 | Huang | ...................... | G06F 7/24 |
| 8,627,296 B1 * | 1/2014 | Picard | ................ | G06F 11/3684 |
| | | | | 717/124 |
| 9,838,482 B1 * | 12/2017 | Hardy | ................... | H04L 67/141 |
| 2003/0028579 A1 * | 2/2003 | Kulkarni | .................. | G06F 8/30 |
| | | | | 718/100 |
| 2006/0075306 A1 * | 4/2006 | Chandrasekaran | .......................... | |
| | | | | G06F 11/3688 |
| | | | | 714/47.2 |
| 2007/0011143 A1 * | 1/2007 | Fuh | ....................... | G06F 16/951 |
| 2009/0037013 A1 * | 2/2009 | Hendler | .......... | G05B 19/41875 |
| | | | | 700/103 |
| 2009/0070336 A1 * | 3/2009 | Wiechers | ............. | G06F 16/972 |

(Continued)

OTHER PUBLICATIONS

Laurent Broudoux, Sep. 26, 2017, "Mocking Microservices Made Easy with Microcks") (Year: 2017).*

(Continued)

*Primary Examiner* — Noor Alkhateeb
(74) *Attorney, Agent, or Firm* — Invoke

(57) ABSTRACT

Embodiments allow a mock-enabled software module to access a store of mock output data. Sets of mock output values ("SMOVs"), stored within the mock output store, are mapped to one or more key input values. When input sent to a mock-enabled software module includes one or more key input values that map to a given SMOV, the SMOV is included in a mock response from a target module of the given SMOV. When a set of input values, sent to a mock-enabled software module, does not include key input values that map to a SMOV, the mock-enabled module produces output without triggering any mock response. The mock output store may contain one or more replacement templates that are used to replace one or more mock output values, in a mock response, with one or more corresponding input values from the set of input values received by the triggering module.

21 Claims, 4 Drawing Sheets

(56) References Cited

U.S. PATENT DOCUMENTS

| 2009/0150895 A1* | 6/2009 | Pullo | .................. G06F 11/3409 |
| | | | 718/104 |
| 2011/0239194 A1* | 9/2011 | Braude | .............. G06F 11/3688 |
| | | | 717/124 |
| 2015/0100600 A1* | 4/2015 | McGee | .............. G06F 9/44505 |
| | | | 707/770 |
| 2015/0363302 A1* | 12/2015 | Young | ................ G06F 11/3688 |
| | | | 717/130 |
| 2017/0286277 A1* | 10/2017 | Lau | ..................... G06F 11/3447 |
| 2017/0300402 A1* | 10/2017 | Hoffner | .............. G06F 11/3664 |
| 2017/0351530 A1* | 12/2017 | Gupta | .................. G06F 9/4405 |
| 2018/0060220 A1* | 3/2018 | Yao | ..................... G06F 11/3684 |
| 2018/0173605 A1* | 6/2018 | Kadioglu | ........... G06F 11/3688 |
| 2018/0268307 A1* | 9/2018 | Kobayashi | .............. G06N 5/04 |
| 2018/0276111 A1* | 9/2018 | Datta | ................. G06F 11/3696 |
| 2018/0300228 A1* | 10/2018 | Beyel, III | .......... G06F 11/3688 |

OTHER PUBLICATIONS

Jan M. Benjamin, Mar. 6, 2018,"How to mock out external services for API tests") (Year: 2018).*
"Mockito—All about Spies", Himanshu Mittal, Apr. 29, 2018 (Year: 2018).*
"Creating Mocks", Mar. 17, 2018 (Year: 2018).*

* cited by examiner

FIG. 1

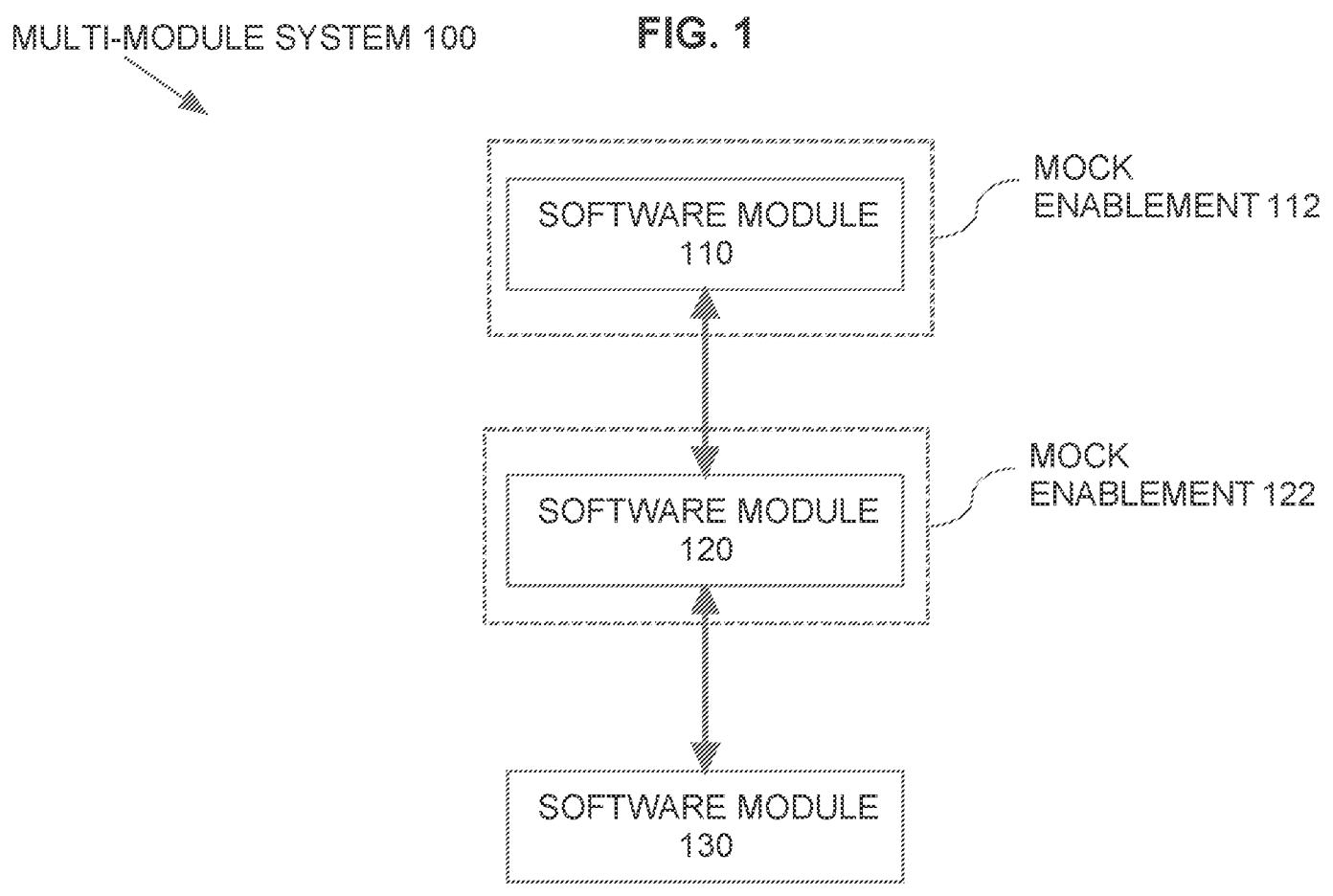

MULTI-MODULE SYSTEM 100

MOCK ENABLEMENT 112

SOFTWARE MODULE 110

MOCK ENABLEMENT 122

SOFTWARE MODULE 120

SOFTWARE MODULE 130

Figure 2:
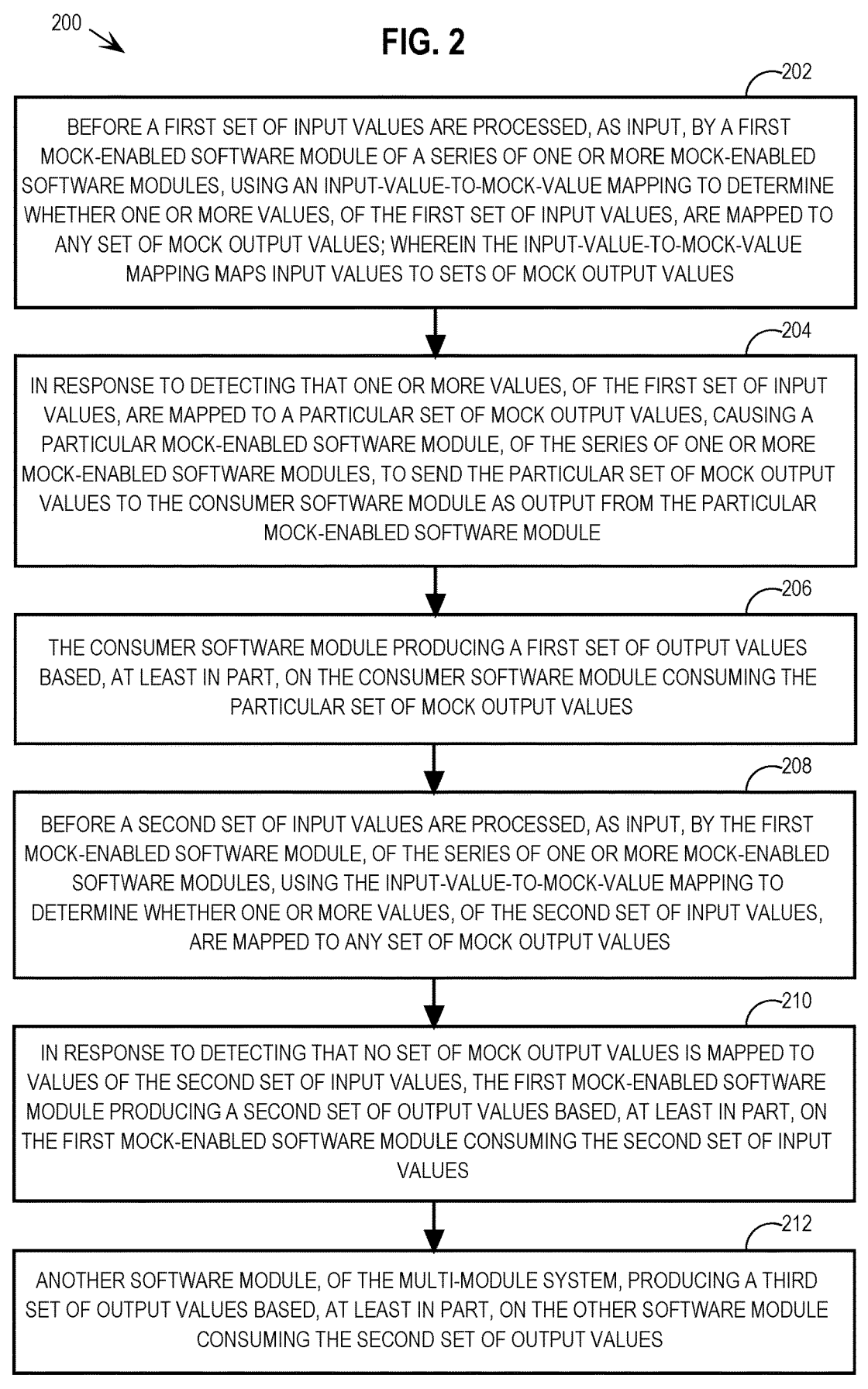

BEFORE A FIRST SET OF INPUT VALUES ARE PROCESSED, AS INPUT, BY A FIRST MOCK-ENABLED SOFTWARE MODULE OF A SERIES OF ONE OR MORE MOCK-ENABLED SOFTWARE MODULES, USING AN INPUT-VALUE-TO-MOCK-VALUE MAPPING TO DETERMINE WHETHER ONE OR MORE VALUES, OF THE FIRST SET OF INPUT VALUES, ARE MAPPED TO ANY SET OF MOCK OUTPUT VALUES; WHEREIN THE INPUT-VALUE-TO-MOCK-VALUE MAPPING MAPS INPUT VALUES TO SETS OF MOCK OUTPUT VALUES

204

IN RESPONSE TO DETECTING THAT ONE OR MORE VALUES, OF THE FIRST SET OF INPUT VALUES, ARE MAPPED TO A PARTICULAR SET OF MOCK OUTPUT VALUES, CAUSING A PARTICULAR MOCK-ENABLED SOFTWARE MODULE, OF THE SERIES OF ONE OR MORE MOCK-ENABLED SOFTWARE MODULES, TO SEND THE PARTICULAR SET OF MOCK OUTPUT VALUES TO THE CONSUMER SOFTWARE MODULE AS OUTPUT FROM THE PARTICULAR MOCK-ENABLED SOFTWARE MODULE

206

THE CONSUMER SOFTWARE MODULE PRODUCING A FIRST SET OF OUTPUT VALUES BASED, AT LEAST IN PART, ON THE CONSUMER SOFTWARE MODULE CONSUMING THE PARTICULAR SET OF MOCK OUTPUT VALUES

208

BEFORE A SECOND SET OF INPUT VALUES ARE PROCESSED, AS INPUT, BY THE FIRST MOCK-ENABLED SOFTWARE MODULE, OF THE SERIES OF ONE OR MORE MOCK-ENABLED SOFTWARE MODULES, USING THE INPUT-VALUE-TO-MOCK-VALUE MAPPING TO DETERMINE WHETHER ONE OR MORE VALUES, OF THE SECOND SET OF INPUT VALUES, ARE MAPPED TO ANY SET OF MOCK OUTPUT VALUES

210

IN RESPONSE TO DETECTING THAT NO SET OF MOCK OUTPUT VALUES IS MAPPED TO VALUES OF THE SECOND SET OF INPUT VALUES, THE FIRST MOCK-ENABLED SOFTWARE MODULE PRODUCING A SECOND SET OF OUTPUT VALUES BASED, AT LEAST IN PART, ON THE FIRST MOCK-ENABLED SOFTWARE MODULE CONSUMING THE SECOND SET OF INPUT VALUES

212

ANOTHER SOFTWARE MODULE, OF THE MULTI-MODULE SYSTEM, PRODUCING A THIRD SET OF OUTPUT VALUES BASED, AT LEAST IN PART, ON THE OTHER SOFTWARE MODULE CONSUMING THE SECOND SET OF OUTPUT VALUES

FIG. 4

AUTOMATIC MOCK ENABLEMENT IN A MULTI-MODULE SOFTWARE SYSTEM

FIELD OF THE INVENTION

The present invention relates to automatically causing software modules to output a desired set of output values without the software modules receiving input that would cause the software modules to output the desired set of output values.

BACKGROUND

Many times, an application system is comprised of multiple software modules that work together to accomplish a given function of the system. Examples of software modules include: clients, servers, methods within a stand-alone application, etc. The multiple software modules generally function by sending and receiving messages (such as requests for information), and by sending and receiving output (such as responses to requests for information that include the requested information).

For example, in a client-server system (which necessarily comprises multiple modules), a client software module sends, to a server software module, a request to perform a particular service based on a set of input values provided with the request. The server software module processes the request based, at least in part, on the received input values and returns, to the client, a response that includes output values that reflect the result of performing the particular service based on the received input values. The server may call upon one or more other services to provide information needed to fulfill the received request.

As another example, multiple software modules (such as methods in a Java class) implement a particular stand-alone application. Because the stand-alone application includes multiple methods, the stand-alone application comprises a multi-module system. As with the client-server system, the multiple methods in the stand-alone application work together, via messages, to accomplish a given function for the stand-alone application.

When the functionality of a particular software module in a multi-module system is changed, the change generally affects one or more of the other modules in the multi-module system. Changes to the functionality may, for example, affect the format of input values, the format of output values, the number and/or type of input parameters, the number and/or type of output values, and/or the output that is produced by any given input. When changes to a module affect other modules in the multi-module system (such as "downstream" modules that consume output from the changed module, or "upstream" modules that provide input to the changed module), it can be difficult to ensure that the other modules function properly given the change.

For example, developing and testing a change to a complex software module can be very time consuming, and the time required for such development may become a long pole for implementing the change in other software modules in the system. Specifically, in the case of changes that affect the output of the changed module, downstream modules must be developed and tested on the new output from the changed module. However, prolonged development of the upstream module delays the ability of the changed module to generate output that reflects the change, which, in turn, delays testing and development of the downstream modules given the change.

Even when development of a software module is complete, it can be difficult to cause the changed module to output particular values that are needed to develop and/or test downstream modules. For example, a changed software module may employ internal algorithms that are so complex as to render it difficult to identify what inputs to the module are required in order to generate needed output values. In such cases, developers can do a series of trial-and-error tests to determine which input values produce the desired output. However, such trial-and-error tests can be very time-consuming, which further delays quality assurance testing or development of downstream modules.

One technique is to statically feed, to modules that are downstream from a changed module, mock output data that includes those outputs that are needed to test the software modules. Accordingly, the downstream modules consume the mock response as if the mock response were produced by the upstream module. However, this technique can be tedious because a static mock response is generally coded into a software module itself, and changing the mock output data requires changing the software module and restarting or even recompiling the module before the changed mock response is available for testing. Thus, changing the software modules themselves in order to use mock output data for software testing is costly in terms of the computing power and development time needed to apply and adjust the static mock response.

Furthermore, use of hard-coded mock responses to test or develop functionality of a multi-module system restricts the ability to run multiple different tests at a time, and renders it difficult for multiple test groups to coordinate providing different mock output data to a given module in the same environment. Also, because the software modules themselves must be changed in order to change the scenario being tested by a static mock response, control of changing the current test scenario is taken out of the hands of the testing professionals who generally do not make changes to the software modules that are being tested.

Thus, it would be beneficial to maintain a store of mock output data, and to facilitate automatic and flexible identification of particular mock output values to be included in a mock response. Further, it would be beneficial to provide for parallel testing of multiple different mock output scenarios from a particular module in the same environment.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 1 depicts an example multi-module system on which embodiments may be implemented;

FIG. 2 depicts a flowchart for providing mock output values, to a consumer software module of a multi-module system, as if the mock output values were produced by a mock-enabled software module of the system;

FIG. 4 is a block diagram of a computer system on which embodiments may be implemented.

DETAILED DESCRIPTION

Figure 3:
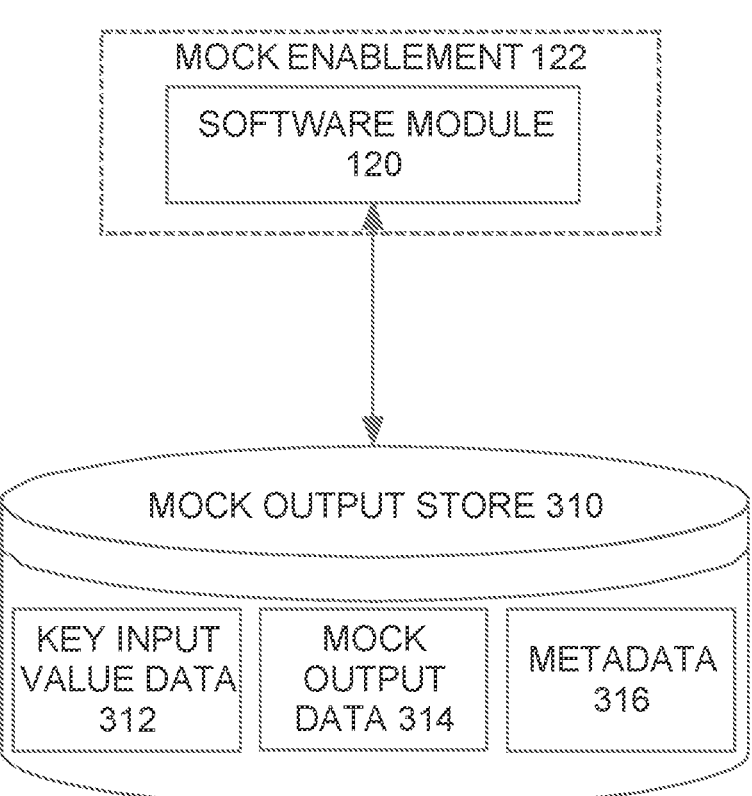
FIG. 3 depicts a mock output store, which is accessible by a software module of a multi-module system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Embodiments allow a mock-enabled software module to produce either (a) normal output, or (b) output that includes one or more "mock" values. In one embodiment, special input values are used to signal to the mock-enabled software module to include mock values in the output. When such input values are not present, the mock-enabled software module produces output normally.

In one embodiment, the mock-enabled software module belongs to a multi-module system and has access to a store of mock output data. When special input is received, the mock-enabled software module dynamically outputs particular mock output values, from the store, in a mock response.

As mentioned above, the mock output may be triggered by special input. In one embodiment, sets of mock output values ("SMOVs"), stored within the mock output store, are mapped to one or more particular input values. When input that is sent to a particular mock-enabled software module includes one or more key input values that map to a given SMOV, the mock output values in the given SMOV are automatically provided as output from a target module, in place of other output values that would normally have been provided by the target module. When a set of input values, sent to a mock-enabled software module, does not include key input values that map to a SMOV in the mock output store, the mock-enabled module does not trigger any mock output. Instead, the mock-enabled module generates output, as normal, based on the input.

A mock-enabled software module that receives one or more key input values that map to a given SMOV is referred to herein as a "triggering module". Software module output that includes the mock output values of a SMOV is referred to herein as a "mock response". According to embodiments, a target module for a SMOV may be the triggering module that received the input that triggered a mock response, or may be a module that is configured to consume output (either directly or indirectly) from the triggering module (i.e., a "downstream" module).

SMOVs may be whole or partial output sets. When a software module outputs a whole SMOV, the SMOV acts as a complete replacement for the output from the target module of the SMOV. In this case, because no part of the output from the target module needs to be produced by the target module, the functionality of the target module and any calls to other software modules that contribute to producing output for the target module are bypassed, where the functionality of a bypassed module is not engaged to produce output.

However, when a given software module outputs a partial SMOV, the partial output represents only some of the output values that are output by the module. In this case, the functionality of the given module is called upon to produce output based on the received input, including calling upon any other software modules that contribute to producing output for the given module. Before sending the produced output to a receiving module in the system, the given module replaces values in its generated output with corresponding mock output values from the partial SMOV.

Furthermore, according to an embodiment, the mock output store contains one or more replacement templates that are used to replace one or more mock output values in a mock response with one or more corresponding input values from the set of input values received by the triggering module. Replacing mock output values with corresponding input values can be used to ensure that a mock response does not include stale values from the SMOV, such as a stale timestamp, example user information that is inconsistent with the user information in the input, etc.

Given that the content of the SMOVs and the key input values that map to the SMOVs are controlled externally from the software modules themselves (i.e., within the mock output store), no changes to the software modules themselves are needed (a) to adjust the mock output values that are available for use, or (b) to cause particular software modules to output specific SMOVs in response to specific requests. For example, to add a new SMOV with associated triggering input, developers need only add the new SMOV to the store with information that the SMOV maps to particular input values. To trigger this new SMOV, a developer sends a request, to a mock-enabled software module, that includes the particular input values mapped to the SMOV, which automatically causes the target module of the new SMOV to produce a mock response based on the SMOV.

Thus, by changing the contents of the mock output store, developers may easily control experiments in the multi-module system without having to change the software modules themselves when new or different mock responses are needed. As such, embodiments eliminate the need to change and then restart or recompile software modules when the testing scenario changes, which allows for control of testing to be with testing professionals rather than developers of the software modules and also reduces cost of applying multiple testing scenarios in terms of processing power and development time. Furthermore, embodiments allow any number of SMOVs to be stored within the mock output store. In this way, testers are able to set up many different tests and run any number of tests in parallel, while the multi-module system is running, by adjusting the contents of the store. Also there is no need to edit, or take offline, a previously-established SMOV that may be valuable in future tests. Therefore, embodiments facilitate efficient unblocking of development or testing of modules affected by any software module in the multi-module system.

Because the mock outputs are automatically triggered in response to receipt of particular mapped input values, multiple different mock responses can be provided by a given module in the same environment (without manual intervention), simply by changing the input values in a request that involves the given module. Because any given mock-enabled module is able to provide one of a virtually unlimited number of mock responses on demand, multiple different developers may perform multiple different tests in parallel within the same multi-module system and in the same environment without extensive coordination between different testing and development projects.

Multi-Module System

FIG. 1 depicts a block diagram of a multi-module system 100 in a non-production environment. As depicted in FIG. 1, multi-module system 100 includes software modules 110, 120, and 130. In the examples that reference multi-module system 100, the system is characterized as implementing a client-server system. Nevertheless, the various software modules referred to herein may represent any kind of software module, e.g., server, client, method of a stand-alone application, etc. Also, embodiments are not limited to a client-server model, and may function according to any system communication model.

A client-server system includes a client software module (such as software module 130) that sends a request for a server software module (such as software module 120) to perform a particular function. Such a request includes or references input values on which the particular function is based. The server software module performs the requested function based on the input values from the client, including requesting and receiving information from other modules (such as software module 110) if needed. The server software module then returns output values in a response to the client.

To illustrate in the context of multi-module system 100 implementing a client-server system, a user of a computing device running software module 130 (acting as a client) submits a request, to run a loan authorization function, to software module 120 (acting as a server). The request includes one or more input values (e.g., information identifying the user, the user's income, residency information, etc.) on which the requested service is to be based.

Software module 120 is configured to pull credit reports for the identified user based on the input information provided in the request, and then to send a request for a credit decision to software module 110, which implements a credit decisioning model. The request to software module 110 includes input values indicating credit information pulled by software module 120, and also input values passed on from the request generated by software module 130.

Software module 110 generates a credit decision based on the input parameters sent from module 120, and returns a response that includes the credit decision to software module 120. Software module 120 persists the credit decision, e.g., to persistent storage of a database system that is communicatively connected to software module 120, and returns information from the credit decision to software module 130. Software module 130 causes the received information to be displayed in a user interface on a display device of the computing device running software module 130.

Providing Mock Output Values from a Mock-Enabled Software Module

Mock-enabled software modules, such as those of multi-module system 100, have access to a mock output store and may be triggered to cause output of a mock response within the system. FIG. 2 depicts a flowchart 200 for providing mock output values, to a consumer software module of a multi-module system, as if the mock output values were produced by a mock-enabled software module of the system. Specifically, at step 202, before a first set of input values are processed, as input, by a first mock-enabled software module of a series of one or more mock-enabled software modules, using an input-value-to-mock-value mapping to determine whether one or more values, of the first set of input values, are mapped to any set of mock output values, where the input-value-to-mock-value mapping maps input values to sets of mock output values.

Mock Output Store

FIG. 3 depicts a mock output store 310 that, as an example, is being accessed by software module 120. Mock output store 310 contains key input value data 312, mock output data 314, and metadata 316. Mock output store 310 may be implemented wholly or in respective parts by one or more of a relational database, an XML database, a cloud storage service (such as Amazon S3), or any other data storage system.

Key input value data 312 includes information that facilitates determining whether a SMOV is mapped to one or more key values in any given set of input values. Specifically, key input value data 312 includes one or more paths that identify the locations, within a hierarchical document storing input values, of the one or more key values that are mapped to SMOVs stored in mock output data 314. These paths are used, as described below, to search a set of input values for key input values. When an input value is mapped to a SMOV based, at least in part, on key input value data 312, this input value is referred to herein as a "key" input value. According to an embodiment, a key input value is represented by a single value or by a range of values.

According to an embodiment, each path stored in key input value data 312 is associated with a software module that receives input that conforms to the structure of the path. For example, key input value data 312 includes the following key value paths mapped to software module 120: "/requestPayload/customers/0/income"; and "/requestPayload/customers/0/username". For a path associated with module 120 to be valid, module 120 must be configured to receive hierarchically-organized input with a value at the location indicated by the path.

According to an embodiment, key input value data 312 further includes a data structure (such as a database table, a list, or any other kind of object) that stores mapping data that maps key input values to respective SMOV identifiers.

According to another embodiment, one or more key input values are mapped to a given SMOV based on an identifier of the SMOV including the one or more key input values. In this embodiment, the identifiers of the SMOVs in mock output data 314 constitute mapping data that maps key input values to the SMOVs. To illustrate, a particular SMOV is stored, within mock output data 314, in a file with the filename "income_55555.json", which includes an example SMOV identifier "income_55555". In this example identifier configuration scheme, the property name of a key input value directly precedes the associated key value within the identifier.

According to an embodiment, any set of input values that includes the value "55555" maps to this particular SMOV. In this embodiment, input data that includes the value "55555" at any of the one or more paths in key input value data 312 maps to the SMOV with the identifier "income_55555". According to another embodiment, key input values map to SMOVs based on property name/value pairs. In this embodiment, any set of input values that includes an input value named "income" with the value "55555" maps to the SMOV with the identifier "income_55555". This embodiment allows multi-module system 100 to be more precise in the search, within input data, for key input values.

According to an embodiment, at least some of the SMOVs in mock output data 314 are mapped, by key input value data 312, to combinations of key values. For example, a given file in mock output data 314 has the following identifier: "income_55555-username_TomJohnson01". This identifier maps the identified SMOV to a combination of input values, received by a given software module, that has both: an input value with the property name "income" with the value "55555"; and an input value with the property name "user-name" with the value "TomJohnson01".

Mock Output Data

According to one or more embodiments, each of one or more SMOVs in mock output data 314 is associated with metadata that identifies a respective target software module in system 100 that is the target of the SMOV. For example, a given SMOV is associated with an identifier of a target software module, software module 110. Thus, when the given SMOV maps to key values in a particular set of input values (whether received by software module 110 or by another module that is upstream from module 110), the SMOV is included in the output for target software module 110. A SMOV that is not associated with an identifier of a target software module directly targets the triggering software module as the implicit target module.

Each software module outputs a particular pattern of data (including data types, property names, output format, etc.). A SMOV, whose target module is a given software module, includes output values that are the same kind of data that is output by the target module. Especially in the case of a whole SMOV, the SMOV is also stored in mock output data 314 in the format of the output of the target module. Alternatively, the values in the SMOV may be formatted to conform to the target software module output format upon integrating the SMOV into a mock response for the target module.

According to an embodiment, metadata for a SMOV indicates whether the SMOV represents a whole set or a partial set of output values. Furthermore, according to an embodiment, one or more SMOVs in mock output data 314 are associated with one or more candidate triggering software modules. In such an embodiment, any given mock-enabled software module only evaluates, for key input value mappings, SMOVs for which the given software module is a candidate triggering module.

Mock Enablement

As depicted in the example arrangement of FIG. 1, software modules 110 and 120 are mock-enabled by mock enablements 112 and 122, respectively. According to embodiments, a module may be mock-enabled in any way, or by using any combination of mock-enablement systems.

According to a first mock-enablement system, a software module is mock-enabled based on an enabling annotation that mock-enables the module by allowing the module access to mock output store 310. Addition of an enabling annotation to a software module further causes the software module to identify whether one or more input values, in a received request, map to a SMOV prior to engaging the functionality of the module. Furthermore, addition of an enabling annotation to a software module enables the module to receive or pass on directions to output a SMOV (as described in further detail below).

To illustrate a mock-enabling annotation in the case of Spring-enabled Java applications, the following annotation is added to a software module implemented by the method "getCustomer":

@SmartMock (mockPath="location-of-mock-output-
        store") public Customer getCustomer (long id)

According to implementations, if the contents of mock output store 310 are located at multiple different locations, one or more additional parameters may be included in the enabling annotation to indicate one or more additional locations of information for store 310. In the above example, an Aspect generated based on the annotation of the "getCustomer" method intercepts the input to the method before the method runs to determine whether the input includes key input values that trigger a mock response in the system.

According to another embodiment, a software module, which is part of a multi-module system, is mock-enabled by a mock-enabling software module that is also part of the system. The mock-enabling software module maintains a list of one or more software modules in the multi-module system that are mock-enabled, and also has access to mock output store 310. When a mock-enabled software module receives input, the mock-enabling software module inspects the one or more input values for key input values. Upon detecting that one or more key input values map to a SMOV in mock output store 310, the mock-enabled software module causes the mapped SMOV to be used as output values by a target mock-enabled software module that is targeted by the SMOV, as described herein.

According to embodiments, a software module that is not mock-enabled performs its function without scanning its input for key input values, triggering any mock outputs, or providing mock output itself.

Series of Mock-Enabled Software Modules

A series of mock-enabled software modules comprises one or more mock-enabled software modules from the same multi-module system. According to an embodiment, a series of mock-enabled software modules are modules that receive input from a previous module in the series (excepting the first module of the series) and provide output to a subsequent module of the series (excepting the last module of the series). For example, with reference to FIG. 1, software modules 110 and 120 are mock-enabled, and comprise an example series of mock-enabled software modules.

According to another embodiment, a series of mock-enabled software modules may have intervening software modules that are not mock-enabled. An intervening software module between a first and second module receives input (either directly or indirectly) from the first module and provides output (either directly or indirectly) to the second module. Because intervening modules are effectively between the first and second modules, the intervening modules are described as "mid-stream". For example, software module 120 is an intervening module that is mid-stream between software module 110 and software module 130.

Determining a SMOV Mapped to Input Values

Continuing with the illustration of step 202, software module 130 submits a loan authorization request to software module 120. The request includes the following input values: username="TomJohnson01"; SSN="444-44-4444"; and income="55555". These values may be passed into a software module in any way, including as parameters, as values in an object, or in a document (such as an extensible markup language (XML) document, etc.). For purposes of illustration, the input values of the example request are in a Java object.

Because software module 120 is mock-enabled based on mock enablement 122 (and, as such, has access to mock output store 310), before the request from software module 130 is processed by software module 120, software module 120 determines whether a single input value, or a combination of input values, from the received request is mapped to a SMOV in store 310.

According to an embodiment, when a mock-enabled software module receives a request that represents one or more input values within an object, the software module automatically serializes the object into a hierarchical document, such as a JavaScript Object Notation (JSON) document. Thus, continuing with the above example, software module 120 automatically serializes the input object into a particular JSON document. Then, for each SMOV of a set of SMOVs in mock output data 314, for which module 120 is a candidate triggering module, module 120 searches the JSON for key input values that map to the respective SMOV based, at least in part, on the paths stored in key input value data 312.

To illustrate, module 120 determines whether a SMOV in mock output data 314 with the identifier "income_55000" maps to any input value in the JSON document. Module 120 detects that the identifier for the SMOV includes the property name "income", and automatically identifies a path, from key input value data 312, that references "income" (e.g., "/requestPayload/customers/0/income"). Module 120 determines whether the location identified for the property name "income" in the particular JSON document has the value "55000". Because the value, at the location for income in the JSON document, does not match "55000", module 120 moves on to an uninspected SMOV in mock output data 314 for which module 120 is a candidate triggering module, if any.

In this example, module 120 next determines whether a SMOV in mock output data 314 with the identifier "income_55555" maps to any input value in the JSON document. Using the path for "income" (or a cached value for income from the JSON document), module 120 determines whether the location identified for the property name "income" in the JSON has the value "55555".

Examples herein describe software modules 110 and 120 having access to store 310 and implementing the mock-enabling features. However, according to embodiments, another entity such as a mock-enabling software module, or a mock-enabling entity associated with a mock-enabled software module (such as an Aspect), may implement the mock-enabling features, including accessing store 310, identifying key input values that map to a SMOV, causing a target module to output a SMOV, etc.

At steps 204 and 206 of flowchart 200, in response to detecting that one or more values, of the first set of input values, are mapped to a particular set of mock output values, causing a particular mock-enabled software module, of the series of one or more mock-enabled software modules, to send the particular set of mock output values to the consumer software module as output from the particular mock-enabled software module; and the consumer software module produces a first set of output values based, at least in part, on the consumer software module consuming the particular set of mock output values.

Continuing with the previous example, because the value of "income" in the particular JSON document is "55555", software module 120 triggers output of this SMOV by the target module for the SMOV. Software module 120 is now a "triggering module" because module 120 identified the mapping between the key input values and the SMOV, and also the set of input values that includes the key input values is referred to herein as the "triggering input".

Directly Triggering Output of Whole SMOVS

According to an embodiment, the triggering software module is the same software module that returns the SMOV as output, which is referred to herein as direct triggering of a mock response. Continuing with the above example, the identified SMOV is a whole output set, and module 120 is directly triggered to output the identified SMOV based on one of: the target module of the SMOV is module 120; or the SMOV has no listed target module.

In response to mock-enabled software module 120 detecting that one or more input values included in the request from software module 130 map to the identified whole SMOV, software module 120 sends the SMOV as a response to software module 130 as if the mock output values of the SMOV were outputs generated, by software module 120, as a response to the request.

Because the mapped SMOV is a whole set of output values for software module 120, returning the mock output values to software module 130 does not require the functionality of module 120 or the functionality of module 110, which is called on by module 120 in the course of the functionality of module 120. In this way, both modules 120 and 130 are bypassed in this example.

Indirectly Triggering Whole SMOVS

According to an embodiment, the triggering software module is not the same as the target software module. This is referred to herein as indirect triggering of a mock response. In this embodiment, the target software module is "downstream" from the triggering software module, meaning that the target software module consumes, either directly or indirectly, output from the triggering software module.

For example, as described above, software module 120 determines that one or more input values in the request from software module 130 map to a particular whole SMOV. Software module 120 further determines, e.g., from meta-data of the particular SMOV, that the target module of the SMOV is software module 110. Based on determining that the target module of the SMOV is software module 110, software module 120 sends an identifier of the SMOV to software module 110.

Because the identified SMOV is a whole output value set, the series of modules starting with module 120 and ending with module 110 are bypassed. Specifically, based on the identified SMOV representing all of the output for module 110, not only is output generated by the functionality of module 110 not needed to produce the mock output including the SMOV, the output of software module 120 is also not needed for software module 110 to produce output. Furthermore, in the case that one or more intervening modules are situated mid-stream between software module 120 and software module 110 (not depicted in FIG. 1), these intervening modules simply pass on the identifier of the particular SMOV downstream until the SMOV identifier reaches module 110. As with software modules 110 and 120, because the output of each of these intervening software modules is not needed for software module 110 to output the whole SMOV in a mock response, each intervening software module is also bypassed.

In response to receiving the identifier of the particular whole SMOV, software module 110 outputs the particular whole SMOV in a manner described above in connection with the direct triggering of mock output for software module 120. According to the example above, the mock response from module 110 is returned to software module 120 (via any intervening modules, if applicable). The consuming module that consumes the mock response produced by software module 110 processes the mock response as if it were generated by software module 110, including processing the values in the response as input, and, if appropriate, scanning the values in the response for one or more key input values that map to a SMOV as described herein.

Returning Partial SMOVS

According to an embodiment, software module 120 identifies a partial SMOV as mapping to received key input values. When a SMOV is a partial set, the SMOV does not include all needed output values for the target module. As such, software module 120 processes the request in order to produce a response, including invoking all additional software modules (such as software module 110) that software module 120 requires in order to process the request.

For example, if software module 120 is the target module of the partial SMOV, software module 120 sends a loan authorization request to software module 110, receives the output from processing the request from software module 110, and then, in turn, formulates an output based, at least in part, on the information from software module 110.

Before sending the generated output to software module 130, software module 120 replaces one or more output values in the generated output with the one or more corresponding mock output values in the partial SMOV. In this embodiment, metadata for the partial SMOV includes a template with instructions for replacing values in the output of software module 120 with corresponding values from the partial SMOV.

According to another example, software module 110 is the target module of the partial SMOV identified by software module 120. In this case, software module 120 processes the request and sends, to software module 110, an identifier of the partial SMOV along with the output generated by software module 120 based on the request. Because the SMOV is a partial output value set, software module 110 also produces output based on the information received from software module 120. Before sending the output to software module 120, software module 110 replaces one or more output values in the generated output with one or more corresponding mock output values from the partial SMOV identified by module 120. Thus, software module 120 receives the SMOV as part of the mock response from software module 110.

Mock-Enabled Module Processing Input that does not Trigger a Mock Response

A software module that is mock-enabled processes inputs without triggering any mock response when received input values do not map to any applicable SMOV in mock output data 314. Specifically, at step 208 of flowchart 200, before a second set of input values are processed, as input, by the first mock-enabled software module, of the series of one or more mock-enabled software modules, using the input-value-to-mock-value mapping to determine whether one or more values, of the second set of input values, are mapped to any set of mock output values. For example, software module 130 sends a request, to mock-enabled software module 120 that does not include any input values that map (either singly or in combination) to any SMOV in mock output data 314.

At step 210, in response to detecting that no set of mock output values is mapped to values of the second set of input values, the first mock-enabled software module produces a second set of output values based, at least in part, on the first mock-enabled software module consuming the second set of input values. For example, in response to detecting that the request does not include any input values that map (either singly or in combination) to any SMOV in mock output data 314, software module 120 processes the request from software module 130 based, at least in part, on the input values in the request. Software module 120 requests additional information from software module 110 and then receives the output from software module 110.

Module 120 uses the information from software module 110 to produce a response for software module 130 and software module 120 returns, to software module 130, the response to the initial request. Note that it is possible that mock-enabled software module 110 is directly triggered to output a SMOV for consumption by module 120 based on one or more key input values being included in the request from module 120.

At step 212, another software module, of the multi-module system, produces a third set of output values based, at least in part, on the other software module consuming the second set of output values. For example, in response to receiving the response from software module 120, software module 130 produces a set of output values based on the received information. To illustrate, software module 130 displays at least part of the information in the received response in a user interface displayed at a display device of a computing device that runs software module 130.

According to embodiments, the output from software module 130 (which is produced based on output generated by module 120, or produced based on a mock response from module 120) is subject to one or more quality assurance or product development tests. In this way, the mock output values may be used, as part of a suite of controlled mock scenarios, to test the functionality of modules that consume the produced mock responses.

Replacing Values in a Response with Corresponding Input Values

Many times, there are values within a SMOV that must be updated before being used in a mock response by the target module of the SMOV. For example, an identified SMOV includes a timestamp output value. In order for the module that consumes the mock response from the target module to properly function, the value of the timestamp must indicate the date on which the target module is to send out the mock response.

According to embodiments, mock output store 310 stores metadata 316 that includes one or more replacement templates with instructions for replacing a value in a mock response with a corresponding value in the triggering input that triggered the target module to output the mock response. Such replacement templates are software module and/or program function specific. For example, software module 120, which is the target module of an identified SMOV, has access to a hierarchical document storing the triggering input that triggered the mock response based on the identified SMOV. After software module 120 generates a mock response that includes the identified SMOV, software module 120 determines whether metadata 316 includes one or more replacement templates associated with module 120 and/or the program function whose output is being mocked. Accordingly, module 120 identifies at least the following replacement template associated with module 120 in metadata 316:

"requestPath":"/customer/0/applicationDate",
"responsePath":"/responsePayload/customer/0/applicationDate"

In response to identifying this replacement template, software module 120 automatically attempts to make the indicated replacement within the generated mock response. In this way, software module 120 replaces, within the generated mock response, a value at the location associated with "responsePath" with the value at the location associated with "requestPath" in the hierarchically-organized input values.

According to this embodiment, in the case that software module 120 is triggered to output the particular SMOV indirectly, the triggering module, as well as any module that is mid-stream between the triggering module and target module 120, sends to software module 120 the set of input values received at the triggering module.

Controlling the Environment for Mock Enablement

Mock responses are only generated in non-production environments. To this end, metadata 316 stores a list of identifiers that identify those non-production environments in which mock responses are enabled. Adding a non-production environment to the list allows software modules to be mock-enabled within the environment. Accordingly, removing an environment from the list effectively disables any mock enablement of modules in the excluded environment, thereby blocking mock responses from being returned by those modules. In this way, a developer may control whether or not to use mock responses in a given environment without being required to remove mock enablements from software modules in the excluded environment, and without preventing all non-production environments in a system from enabling mock responses.

According to an embodiment, multi-module system 100 tracks when a mock response is provided in response to any request. Continuing with the example used for flowchart 200, the following log message appears in a log stored at mock output store 310 based on software module 120 responding to the request from software module 130 with a mock response based on the key input value named "income" having a value of "55555":

[https-jsse-nio-8103-exec-10] INFO c.l.c.e.m.SmartMock-Aspect—Using MOCK CustomerResponse using mockId=income_55555.

Furthermore, according to an embodiment, any mock response generated within system 100 includes a mock response indicator. For example, any response that includes mock output values also includes a particular mock output value: "mockResponse=TRUE".

Architecture of a Multi-Service System

FIG. 1 depicts a block diagram of a multi-module system 100 in a non-production environment. Non-production environments are software development and testing environments, and software being developed in a non-production environment is not available to the public. As depicted in FIG. 1, software modules 110, 120, and 130 are all part of a multi-module system 100.

A software module comprises a combination of software and an allocation of resources from a computing device. Specifically, a software module is a combination of integrated software components and an allocation of computational resources, such as memory, a computing device and/or memory accessible to the computing device, and/or processes on the computing device for executing the integrated software components on a processor, the combination of the software and computational resources being dedicated to performing the stated functions of the software module.

The configuration of multi-module system 100 is illustrative, and, according to embodiments, a multi-module system may include any number of modules that fulfill any kind of one or more requests. As used herein, a software module may represent multiple software modules in the system, such as a series of multiple modules.

Software modules 110-130 are run by one or more computing devices that are communicatively coupled via a network. The computing devices may be any type of computing device, including, without limitation, workstations, personal computers, laptop computers, personal digital assistants (PDAs), tablet computers, cellular telephony devices such as smart phones, and any other type of computing device.

A network communicatively coupling multiple computing devices running software modules 110-130 may be implemented with any type of medium and/or mechanism that facilitates the exchange of information between computing devices.

In an embodiment, the processes described in connection with any software module herein are performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer. Furthermore, any portion of the processes described in connection with a particular entity may be performed by another entity, according to embodiments.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
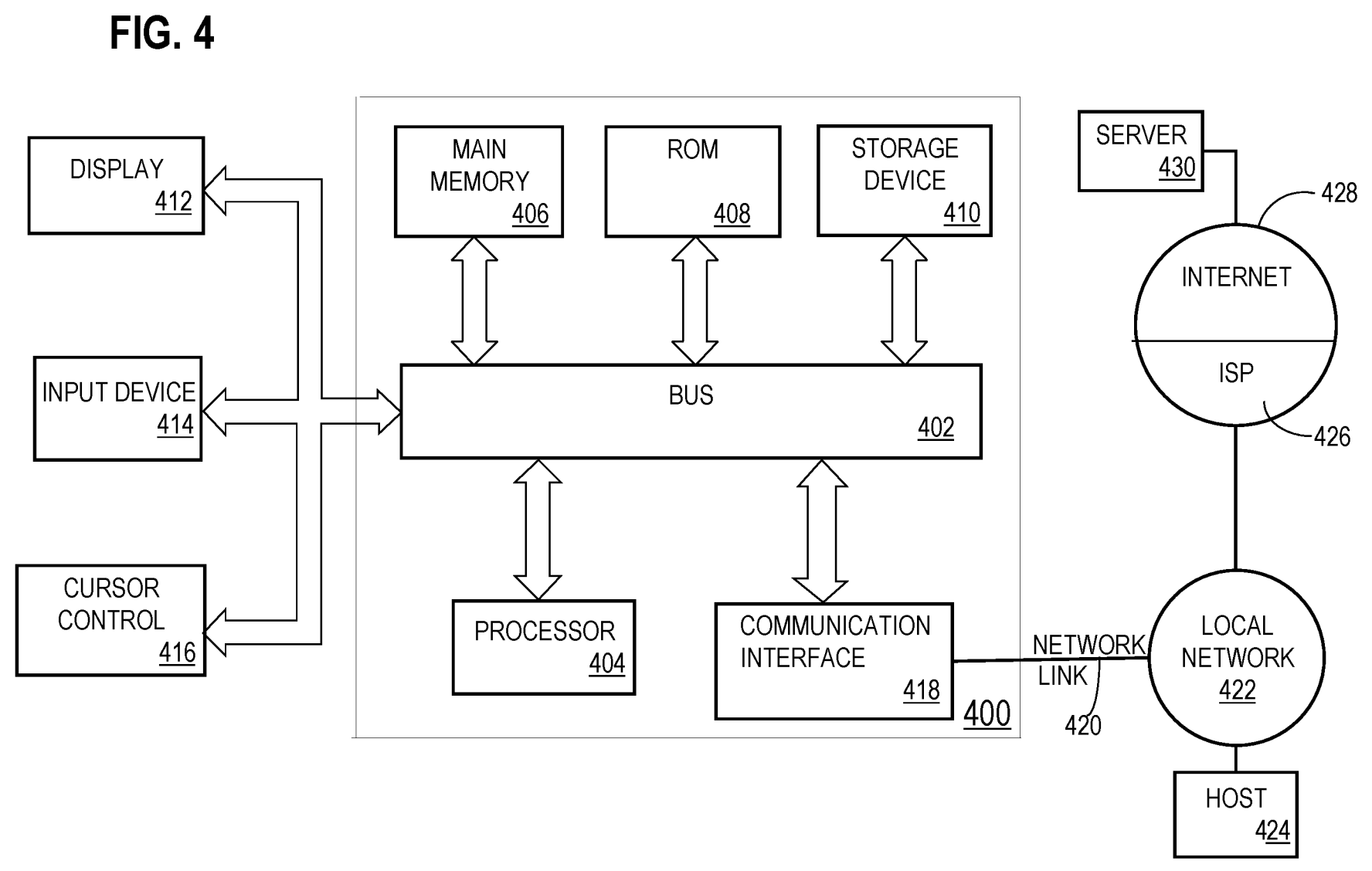

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

receiving, at a first mock-enabled software module of a multi-module system, a first request including or referencing a first set of input values for functionality of the first mock-enabled software module;

serializing, by the first mock-enabled software module, the first request into a hierarchically-organized document and searching the hierarchically-organized document for the first set of input values based at least in part on stored paths;

wherein the first set of input values includes at least two input values each having a property name and a corresponding value within the hierarchically-organized document storing input values of the first request;

determining, by the first mock-enabled software module, whether one or more values, of the first set of input values, are mapped, in an input-value-to-mock-value mapping, to a particular set of mock output values;

wherein the input-value-to-mock-value mapping comprises entries that each map a tuple comprising at least two property-name/value pairs from the hierarchically-organized document to a scenario identifier of the particular set of mock output values;

in response to determining that one or more values, of the first set of input values, are mapped to the particular set of mock output values:

causing an identifier of the particular set of mock output values comprising the scenario identifier to be sent to a downstream target mock-enabled software module distinct from the first mock-enabled software module, and performing, at the downstream target mock-enabled software module, a key-based lookup of the identifier in a shared mock-output store to retrieve the particular set of mock output values;

wherein the downstream target mock-enabled software module is configured to retrieve the particular set of mock output values from a shared mock-output store based on the identifier without invoking native functionality to generate mock values and without accessing the input-value-to-mock-value mapping, and to send the particular set of mock output values unchanged to a consumer software module of the multi-module system;

receiving, at the first mock-enabled software module, a second request including or referencing a second set of input values for the functionality of the first mock-enabled software module;

wherein the first set of input values is different than the second set of input values;

determining, by the first mock-enabled software module, whether one or more values, of the second set of input values, are mapped, in the input-value-to-mock-value mapping, to any set of mock output values;

in response to determining that no set of mock output values is mapped, in the input-value-to-mock-value mapping, to any values of the second set of input values:

processing, by the functionality of the first mock-enabled software module, the second set of input values to produce a set of produced output values; and causing the set of produced output values to be sent directly as input to a consumer software module of the multi-module system;

wherein the method is performed by one or more computing devices.

2. The method of claim 1, wherein the consumer software module to which the particular set of mock output values is sent is the same as the consumer software module to which the set of produced output values is sent.

3. The method of claim 2, further comprising:

the consumer software module producing a first set of output values based, at least in part, on the consumer software module consuming the particular set of mock output values;

determining whether the consumer software module passes a first test based, at least in part on the first set of output values; and the consumer software module producing a second set of output values based, at least in part, on the consumer software module consuming the set of produced output values;

determining whether the consumer software module passes a second test based, at least in part, on the second set of output values.

4. The method of claim 1, wherein the consumer software module to which the particular set of mock output values is sent is different than the consumer software module to which the set of produced output values is sent.

5. The method of claim 1, further comprising:

using, as input for the functionality of the first mock-enabled software module, one or more values of the first set of input values to cause the functionality of the first mock-enabled software module to produce a particular set of output values; and causing the particular set of output values to be sent, with the particular set of mock output values, as input to the consumer software module to which the particular set of mock output values is sent.

6. The method of claim 1, wherein the one or more values, of the first set of input values, are mapped to the particular set of mock output values based, at least in part, on an identifier of the particular set of mock output values comprising each value of the one or more values of the first set of input values.

7. The method of claim 1, further comprising: in response to detecting that the one or more values, of the first set of input values, are mapped to the particular set of mock output values: causing a particular value of the first set of input values to be sent as input to the consumer software module to which the particular set of mock output values is sent.

8. The method of claim 1, wherein:

the first set of input values are sent, to the first mock-enabled software module, as part of a request from the consumer software module to which the particular set of mock output values is sent; and the first mock-enabled software module causes the particular set of mock output values to be sent.

9. The method of claim 1, wherein:

the particular set of mock output values comprises a whole set of mock output values;

one or more intervening mock-enabled software modules, of a series of mock-enabled software modules of the multi-module system, are mid-stream between the first mock-enabled software module and the target mock-enabled software module;

the series of mock-enabled software modules further comprises the first mock-enabled software module;

the first mock-enabled software module causing the identifier of the particular set of mock output values to be sent to the target mock-enabled software module comprises:

each of the series of mock-enabled software modules sending, to a subsequent software module in the series of mock-enabled software modules, at least the identifier of the particular set of mock output values; and the target mock-enabled software module receiving the identifier of the particular set of mock output values from a last software module of the series of mock-enabled software modules.

10. The method of claim 1, wherein: the particular set of mock output values comprises a partial set of mock output values; and the method further comprises:

the target mock-enabled software module invoking one or more additional software modules, of the multi-module system, to retrieve a set of output values produced based on functionality of the one or more additional software modules;

causing the set of output values to be sent, with the particular set of mock output values, as input to the consumer software module to which the particular set of mock output values is sent.

11. One or more non-transitory computer-readable media storing one or more sequences of instructions that, when executed by one or more processors, cause:

receiving, at a first mock-enabled software module of a multi-module system, a first request including or referencing a first set of input values for functionality of the first mock-enabled software module;

serializing, by the first mock-enabled software module, the first request into a hierarchically-organized document and searching the hierarchically-organized document for the first set of input values based at least in part on stored paths;

wherein the first set of input values includes at least two input values each having a property name and a corresponding value within the hierarchically-organized document storing input values of the first request;

determining, by the first mock-enabled software module, whether one or more values, of the first set of input values, are mapped, in an input-value-to-mock-value mapping, to a particular set of mock output values;

wherein the input-value-to-mock-value mapping comprises entries that each map a tuple comprising at least two property-name/value pairs from the hierarchically-organized document to a scenario identifier of the particular set of mock output values;

in response to determining that one or more values, of the first set of input values, are mapped to the particular set of mock output values:

causing an identifier of the particular set of mock output values comprising the scenario identifier to be sent to a downstream target mock-enabled software module distinct from the first mock-enabled software module, and performing, at the downstream target mock-enabled software module, a key-based lookup of the identifier in a shared mock-output store to retrieve the particular set of mock output values;

wherein the downstream target mock-enabled software module is configured to retrieve the particular set of mock output values from a shared mock-output store based on the identifier without invoking native functionality to generate mock values and without accessing the input-value-to-mock-value mapping, and to send the particular set of mock output values unchanged to a consumer software module of the multi-module system;

receiving, at the first mock-enabled software module, a second request including or referencing a second set of input values for the functionality of the first mock-enabled software module;

wherein the first set of input values is different than the second set of input values;

determining, by the first mock-enabled software module, whether one or more values, of the second set of input values, are mapped, in the input-value-to-mock-value mapping, to any set of mock output values;

in response to determining that no set of mock output values is mapped, in the input-value-to-mock-value mapping, to any values of the second set of input values:

processing, by the functionality of the first mock-enabled software module, the second set of input values to produce a set of produced output values; and causing the set of produced output values to be sent directly as input to a consumer software module of the multi-module system.

12. The one or more non-transitory computer-readable media of claim 11, wherein the consumer software module to which the particular set of mock output values is sent is the same as the consumer software module to which the set of produced output values is sent.

13. The one or more non-transitory computer-readable media of claim 12, wherein the one or more sequences of instructions further comprise instructions that, when executed by one or more processors, cause:

the consumer software module producing a first set of output values based, at least in part, on the consumer software module consuming the particular set of mock output values;

determining whether the consumer software module passes a first test based, at least in part on the first set of output values; and the consumer software module producing a second set of output values based, at least in part, on the consumer software module consuming the set of produced output values;

determining whether the consumer software module passes a second test based, at least in part, on the second set of output values.

14. The one or more non-transitory computer-readable media of claim 11, wherein the consumer software module to which the particular set of mock output values is sent is different than the consumer software module to which the set of produced output values is sent.

15. The one or more non-transitory computer-readable media of claim 11, wherein the one or more sequences of instructions further comprise instructions that, when executed by one or more processors, cause:

using, as input for the functionality of the first mock-enabled software module, one or more values of the first set of input values to cause the functionality of the first mock-enabled software module to produce a particular set of output values; and causing the particular set of output values to be sent, with the particular set of mock output values, as input to the consumer software module to which the particular set of mock output values is sent.

16. The one or more non-transitory computer-readable media of claim 11, wherein the one or more values, of the first set of input values, are mapped to the particular set of mock output values based, at least in part, on an identifier of the particular set of mock output values comprising each value of the one or more values of the first set of input values.

17. The one or more non-transitory computer-readable media of claim 11, wherein the one or more sequences of instructions further comprise instructions that, when executed by one or more processors, cause: in response to detecting that the one or more values, of the first set of input values, are mapped to the particular set of mock output values: causing a particular value of the first set of input values to be sent as input to the consumer software module to which the particular set of mock output values is sent.

18. The one or more non-transitory computer-readable media of claim 11, wherein:

the first set of input values are sent, to the first mock-enabled software module, as part of a request from the consumer software module to which the particular set of mock output values is sent; and the first mock-enabled software module causes the particular set of mock output values to be sent.

19. The one or more non-transitory computer-readable media of claim 11, wherein:

the particular set of mock output values comprises a whole set of mock output values;

one or more intervening mock-enabled software modules, of a series of mock-enabled software modules of the multi-module system, are mid-stream between the first mock-enabled software module and the target mock-enabled software module;

the series of mock-enabled software modules further comprises the first mock-enabled software module;

the first mock-enabled software module causing the identifier of the particular set of mock output values to be sent to the target mock-enabled software module comprises:

each of the series of mock-enabled software modules sending, to a subsequent software module in the series of mock-enabled software modules, at least the identifier of the particular set of mock output values; and the target mock-enabled software module receiving the identifier of the particular set of mock output values from a last software module of the series of mock-enabled software modules.

20. The one or more non-transitory computer-readable media of claim 11, wherein:

the particular set of mock output values comprises a partial set of mock output values; and the one or more sequences of instructions further comprise instructions that, when executed by one or more processors, cause:

the target mock-enabled software module invoking one or more additional software modules, of the multi-module system, to retrieve a set of output values produced based on functionality of the one or more additional software modules;

causing the set of output values to be sent, with the particular set of mock output values, as input to the consumer software module to which the particular set of mock output values is sent.

21. A system comprising:

one or more hardware processors;

one or more non-transitory computer-readable media; and program instructions stored on the one or more non-transitory computer-readable media which, when executed by the one or more hardware processors, cause the system to perform operations comprising:

receiving, at a first mock-enabled software module of a multi-module system, a first request including or referencing a first set of input values for functionality of the first mock-enabled software module;

serializing, by the first mock-enabled software module, the first request into a hierarchically-organized document and searching the hierarchically-organized document for the first set of input values based at least in part on stored paths;

wherein the first set of input values includes at least two input values each having a property name and a corresponding value within the hierarchically-organized document storing input values of the first request;

determining, by the first mock-enabled software module, whether one or more values, of the first set of input values, are mapped, in an input-value-to-mock-value mapping, to a particular set of mock output values;

wherein the input-value-to-mock-value mapping comprises entries that each map a tuple comprising at least two property-name/value pairs from the hierarchically-organized document to a scenario identifier of the particular set of mock output values;

in response to determining that one or more values, of the first set of input values, are mapped to the particular set of mock output values:

causing an identifier of the particular set of mock output values comprising the scenario identifier to be sent to a downstream target mock-enabled software module distinct from the first mock-enabled software module, and performing, at the downstream target mock-enabled software module, a key-based lookup of the identifier in a shared mock-output store to retrieve the particular set of mock output values;

wherein the downstream target mock-enabled software module is configured to retrieve the particular set of mock output values from a shared mock-output store based on the identifier without invoking native functionality to generate mock values and without accessing the input-value-to-mock-value mapping, and to send the particular set of mock output values unchanged to a consumer software module of the multi-module system;

receiving, at the first mock-enabled software module, a second request including or referencing a second set of input values for the functionality of the first mock-enabled software module;

wherein the first set of input values is different than the second set of input values;

determining, by the first mock-enabled software module, whether one or more values, of the second set of input values, are mapped, in the input-value-to-mock-value mapping, to any set of mock output values;

in response to determining that no set of mock output values is mapped, in the input-value-to-mock-value mapping, to any values of the second set of input values:

processing, by the functionality of the first mock-enabled software module, the second set of input values to produce a set of produced output values; and causing the set of produced output values to be sent directly as input to a consumer software module of the multi-module system.

* * * * *